United States Patent [19]

Weber

[11] 3,937,946

[45] Feb. 10, 1976

[54] MULTIPLE FLASH LAMP UNIT
[75] Inventor: Kurt H. Weber, Pepper Pike, Ohio
[73] Assignee: General Electric Company, Schenectady, N.Y.
[22] Filed: Mar. 6, 1974
[21] Appl. No.: 448,671

[52] U.S. Cl............. 240/1.3; 174/68.5; 317/101 CC; 339/17 R
[51] Int. Cl.²......................................... G03B 15/02
[58] Field of Search............. 240/1.3; 354/148, 126, 354/127; 317/101 CC, 101 OH, 101 F; 339/17 R; 431/92, 93, 95 R, 95 A; 174/68.5

[56] References Cited
UNITED STATES PATENTS

| | | | |
|---|---|---|---|
| 2,290,309 | 7/1942 | Aquilla | 431/93 |
| 3,458,270 | 7/1969 | Ganser et al. | 240/1.3 X |
| 3,473,880 | 10/1969 | Wick | 240/1.3 X |
| 3,568,129 | 3/1971 | Gold et al. | 317/101 CC X |
| 3,583,304 | 6/1971 | Brandt | 240/1.3 X |
| 3,598,985 | 8/1971 | Harnden et al. | 240/1.3 |
| 3,608,451 | 9/1971 | Kelem | 240/1.3 X |
| 3,619,590 | 11/1971 | Meulemans et al. | 240/1.3 |
| 3,837,786 | 9/1974 | McDonough et al. | 240/1.3 X |

FOREIGN PATENTS OR APPLICATIONS
11,167  6/1967   Japan

OTHER PUBLICATIONS

Miller, Oran E., *The Red Eye Effect In Flash Color Photography*, Photographic Society of America, July 1952, pp. 425, 426 444.

Eastman Kodak Publication, *Flash Pictures*, Kodak Photo Book, 1967, pp. 16 and 17.

*Primary Examiner*—Fred L. Braun
*Attorney, Agent, or Firm*—Norman C. Fulmer; Lawrence R. Kempton; Frank L. Neuhauser

[57] ABSTRACT

A multiple photoflash lamp unit is connectable to a camera in different orientations in each of which a different group of the lamps is relatively farthest from the camera lens axis. The lamps are arranged so that in any of the orientations of the unit with respect to the camera, only the group of lamps relatively farthest from the lens axis will be flashed. This reduces the "red-eye" effect that can occur when the flashing lamp is close to the lens axis, undesirably causing a red coloration of the pupils of eyes of people in the picture.

21 Claims, 4 Drawing Figures

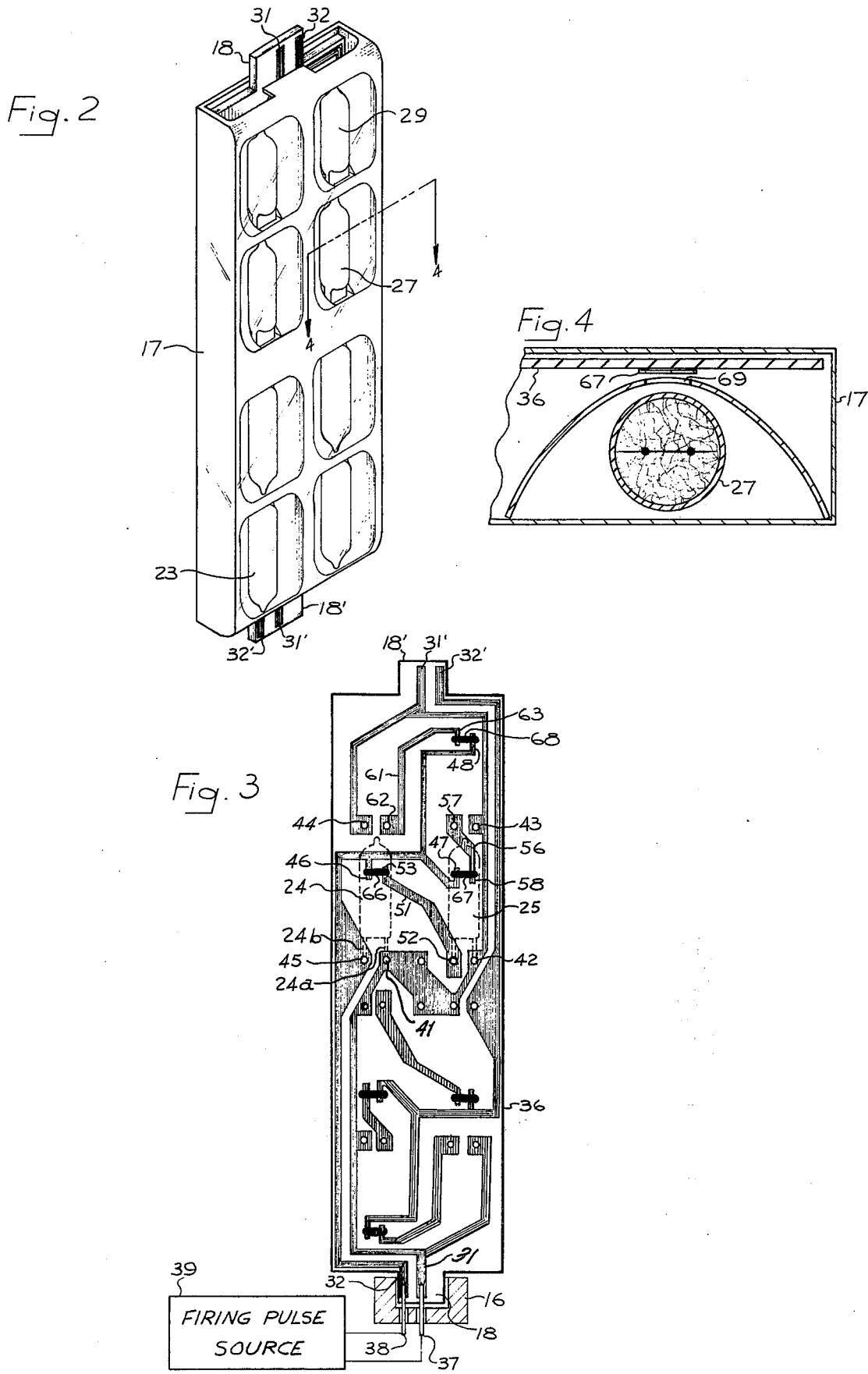

MULTIPLE FLASH LAMP UNIT

BACKGROUND OF THE INVENTION

The invention is in the field of multiple photoflash lamp units, such as flashcubes and planar arrays, adapted to be temporarily attached to a camera and capable of producing a plurality of flashes for taking a plurality of flash pictures.

Various designs and constructions have been proposed for multiple flash units. An example of a flashcube is described in U.S. Pat. No. 3,739,166 to R. M. Anderson. An example of a planar array is described in U.S Pat. Nos. 3,598,984 to S. L. Slomski and 3,598,985 to J. D. Harnden and W. P. Kornrumpf. Numerous types of cameras are provided with built-in sockets to which multiple flash units can be attached. When the flash lamps are close to the camera's lens axis, such as within a few inches, and especially with the small "pocket" cameras, there is a tendency for an undesirable "red-eye" effect to occur, i.e., a red coloring of the pupils of persons in the picture. This is caused because the flash of light enters the person's pupils and illuminates the retinas in the eyes at regions approximately in line with the optical axis of the camera's lens, so that the illuminated red coloring of the retina shows in the picture and causes the person's pupils to appear red. Extender posts are available for positioning flashcubes higher above the camera, and hence farther from the lens axis, for reducing the red-eye effect.

SUMMARY OF THE INVENTION

Objects of the invention are to provide a multiple flash unit which reduces or eliminates red-eye effect, which can be manufactured feasibly and at reasonable cost, and which contains flash sequencing circuitry thereby minimizing the number of electrical connections to the camera and increasing camera design flexibility.

The invention comprises, briefly and in a preferred embodiment, a multiple flash unit that can be connected to a camera in different orientations in each of which a different group of the flash lamps is relatively farther from the camera lens axis than are the other lamps of the unit. The lamps are arranged so that in any of the orientations of the unit with respect to the camera, only the group of lamps relatively farther from the lens axis will be flashed. The invention can be employed in various forms of multiple flash units, such as a double-deck rotatable flash "cube" having connector plugs at each end, or a planar array having a plurality of oppositely disposed connector means.

BRIEF DESCRIPTION OF THE DRAWING

FIG. 2 is a perspective view of the multiple flash lamp unit of FIG. 1.

FIG. 3 is a front view of a circuit board to which flash lamps are connected in the multiple lamp unit.

FIG. 4 is a cross-section view of a portion of FIG. 2, taken on the line 4—4 thereof.

DESCRIPTION OF THE PREFERRED EMBODIMENT

Figure 1:
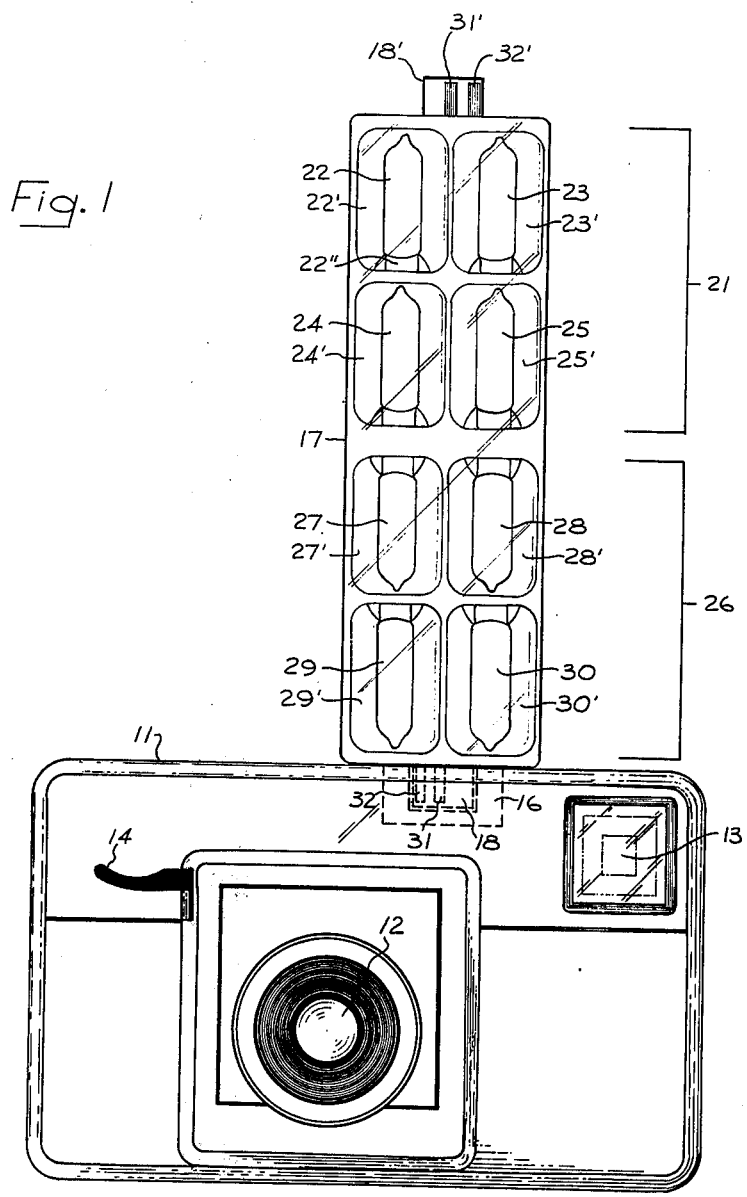
FIG. 1 is a front view of a multiple flash lamp unit in accordance with a preferred embodiment of the invention, attached to a camera.

In FIG. 1, a camera 11 is provided with a lens 12, a view finder 13, a picture-taking button or lever 14, and a socket 16 for receiving a multiple flash unit. When the picture-taking lever 14 is depressed in order to take a flash picture, a firing pulse voltage is applied to the socket 16 in synchronism with opening of the camera shutter, in the case of electrically fired flash lamps, and a mechanical motion is applied at or near the socket 16 in the case of percussively fired flash lamps. These pulses and mechanical motions are referred to generally herein as flash actuation signals.

A multiple flash lamp unit 17, shown as being of the planar array type and containing a plurality of electrically fired flash lamps, is provided with a plug-in mounting device or connector tab 18 at the lower side or end thereof, adapted to fit into the socket 16 of the camera 11. The lamp array 17 is provided with a second plug-in connector tab 18' at the top side or end thereof, whereby the array 17 is adapted to be attached to the camera 11 in either of two orientations, i.e., with either the tab 18 or the tab 18' plugged into the socket 16. The array 17 is provided with an upper group 21 of flash lamps 22, 23, 24, and 25, and a lower group 26 of flash lamps 27, 28, 29, and 30. Reflectors 22', etc., are disposed behind the respective flash lamps, so that as each lamp is flashed its light is projected forwardly of the array 17 and camera 11. The relationship of each reflector to its associated lamp, and a suitable plastic housing and transparent front cover, may be generally that as is disclosed in the above-referenced planar array patents.

In accordance with the invention, the four lamps in the upper group 21 are connected to the lower plug-in tab 18, and the lower group 26 of lamps are connected to the upper plug-in tab 18'. Thus, with the orientation of the array 17 with respect to the camera 11 as shown in FIG. 1, only the upper four lamps of the array, which constitute the upper group 21, can be flashed, and the four lamps of the lower group 26 will not flash. Thus, the above-described undesirable red-eye effect is reduced or eliminated, since the only lamps of the array that can flash are grouped relatively far from the axis of the camera's lens 12. The array 17 can be removed from the camera 11, either before or after all lamps of the upper group 21 have been flashed, and turned around and reinserted into the camera with the upper tab 18' now the lower tab which is inserted into the socket 16, whereupon the group 26 of lamps becomes the upper group, and its lamps are flashed, again reducing or eliminating the red-eye effect because the active lamps are relatively farthest from the axis of the lens 12.

In effect, the part of the unit containing the lower group of lamps, being either group 21 or group 26 depending on the orientation of the array 17 when attached to the camera 11, serves as an extension pedestal for the upper and active group of flash lamps, without wasting space in the unit, and increasing the number of flashes per unit. For the relative sizes of the camera 11 and flash array 17 shown in FIG. 1, the lamps of the upper group 21 (or group 26 if the array is turned over) are generally about twice the distance from the axis of the lens 12 as are the lower group lamps. For smaller cameras having less distance from the axis of the lens 12 to the flash socket 16, this ratio will be greater, thereby relatively more reducing the undesirable red-eye effect that would occur. This objective is preferably accomplished by configuring the array as shown, with a vertical length (height) greater than its width, with the connector tabs 18 and 18' at the ends of the long dimension of the array.

The perspective view of FIG. 2 shows that the array can be shaped in a shallow and compact elongated rectangular body configuration. Electrical connector terminals are provided at the tabs 18 and 18', and if flash sequencing circuitry is included in the multiple flash unit, for instance as illustrated in FIG. 3, only two electrical terminals, which may be in the form of printed circuit stripes, need be provided on each tab. Thus, tab 18 is provided with a pair of electrical terminals 21 and 32, and the tab 18' is provided with a pair of terminals 31' and 32'. These terminals are referred to generally herein as flash actuation coupling means, and they receive the flash actuation signals of the camera when a connector means 18 or 18' is connected to the camera and the picture-taking lever 14 is depressed. The connector terminals are shown in nonsymmetrical positions on the plug-in tabs, to better illustrate the reverse mirror symmetry of the unit, which is further illustrated by the unit being shown upside down in FIG. 2 with respect to its orientation in FIG. 1. It will be noted that the unit looks the same in either of its two orientations (except for a difference that would be apparent if certain ones but not all of the lamps have been flashed). It will also be noted that in the embodiment shown the upper group of flash lamps are always right side up, and the lower group of flash lamps are upside down, no matter which way the array is plugged into the camera. This helps the user to realize that only the upper lamps will flash, and has a further practical benefit because base-down bulbs can better withstand and contain the heat and pressure produced when flashed because the hot combustion particles fall onto the thick-walled base 22'', etc., of the glass bulb, which is thicker than the top.

FIG. 3 shows a circuit board 36 which can be contained within the housing of the unit 17 behind the reflectors 22', etc., and which supports the flash lamps by their lead-in wires and provides for sequential firing of each group of lamps. The plug-in connector tabs 18 and 18' may be formed integrally with the circuit board 36 at opposite ends thereof, as shown. The printed circuitry for flashing the lower inactive group of lamps (which group becomes active when the unit is turned around in reverse orientation with respect to the camera) is a reverse mirror image of the printed circuitry for flashing the active upper group of lamps, as shown.

The camera socket 16 for the flash unit 17 is provided with a pair of contacts 37 and 38 which respectively electrically engage the terminals 31 and 32 of the flash unit when it is plugged into the socket 16.

A firing pulse source 39, which may be contained within the camera 11, is connected to the contacts 37 and 38 of the socket 16. The type of firing pulse or flash actuation signal produced by the source 39 and applied across the contacts 37 and 38 will of course depend on the type of lamps used in the unit 17. If low voltage filament types of flash are employed in the unit 17, the firing pulse source 39 may be a battery or battery-capacitor discharge type, producing, in synchronization with opening of the camera shutter, a pulse of approximately 3 volts to 15 volts or more and of sufficient energy to fire a single flash lamp. An example of a low voltage flash lamp is disclosed in U.S. Pat. No. 3,506,385 to K. H. Weber and G. W. Cressman, and an example of a low voltage flash sequencing circuit is disclosed in U.S. Pat. No. 3,532,931 to P. T. Cote' and J. D. Harnden. If the flash lamps in the multiple flash unit 17 are of the so-called high voltage type, requiring a pulse of approximately 1000 or 2000 volts, the firing pulse source 39 may comprise a suitable battery-capacitor discharge and voltage step-up transformer type of circuit, or may employ a compact piezoelectric element arranged to be impacted or stressed in synchronization with opening of the camera shutter, so as to produce a firing pulse having a voltage of approximately 1000 or 2000 volts and of sufficient energy to fire a single flash lamp. An example of a high voltage flash lamp and a firing pulse source comprising a piezoelectric element synchronized with a camera shutter is described in U.S. Pat. Nos. 2,972,937 and 3,106,080, both to C. G. Suits.

The circuit board 36 in FIG. 3 is shown in the orientation in which the connector tab 18 faces downwardly and is plugged into the camera socket 16, whereby the circuit board terminals 31 and 32 respectively make electrical contact with the socket contacts 37 and 38. The circuit board terminal 31 is part of a continuous conductor run on the board, which is connected to one electrical lead wire (22a, 23a, 24a, etc.) of each of the upper four flash lamps 22, 23, 24, and 25 at points 41, 42, 43, and 44, by suitable means such as soldering, welding, or crimping. For the sake of clarity, only two flash lamps 24 and 25 are shown in FIG. 3, and in dashed lines. Suitable openings are provided through the reflectors at the bases of the lamps, to permit the connections of the lead-in wires to the circuit board.

The other circuit board terminal 32 is part of a conductor run that is connected to lead-in wire 24b of lamp 24 at point 45, and terminates at radiation switch terminals 46, 47, and 48 respectively positioned near lamps 24, 25, and 23. A circuit board conductor run 51 is connected electrically to the remaining lead wire of flash lamp 25 at 52, and terminates at a radiation switch terminal 53 which is near to but spaced from radiation switch terminal 46. A circuit board conductor run 56 is connected electrically to the remaining lead-in wire of flash lamp 23 at point 57, and terminates at a radiation switch terminal 58 which is near to but spaced from radiation switch terminal 47. Similarly, a circuit board conductor run 61 is connected to the remaining lead-in wire of flash lamp 22 at point 62, and terminates at a radiation switch terminal 63 which is near to but spaced from the radiation switch terminal 48.

Radiation switches 66, 67, and 68 are respectively positioned to be in contact with and bridging across the respective pairs of switch terminals 46–53, 47–58, and 48–63. The material for the radiation switches 66, 67, and 68 may be any suitable material initially having an open circuit or high resistance, the resistance thereof becoming zero or a low value when the material receives radiation in the form of heat and/or light from a respective adjacent lamp, upon the lamp being flashed. For this purpose, each of the radiation switches 66, 67, and 68 is respectively positioned behind and near to a flash lamp 24, 25, 23. Windows in the form of transparent sections or openings 69 may be provided in the reflectors in front of the switches as shown in FIG. 4 to facilitate radiation transfer. A suitable material for the radiation switches 66–68 is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a reverse mirror image of the same circuit shown in the upper part of the circuit board. It will be noted that the circuit runs from the plugged-in terminals 31 and 32 at the lower part of the circuit board extend upwardly so as to activate the circuitry in the upper half of the circuit board. These circuit runs and circuitry are referred to generally herein as means for coupling the flash actuation coupling means (terminals 31 and 32, for example) to a group of lamps (the group of lamps 22, 23, 24, and 25, for example). Similarly, when the unit is turned around and tab 18' is plugged into the socket 16, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit of FIG. 3 functions as follows. Assuming that none of the four lamps in the upper half of the unit 17 have been flashed, upon occurrence of a first firing pulse from the source 39, this pulse will be directly applied to the lead-in wires of first flash lamp 24, whereupon the lamp 24 flashes and becomes an open circuit between its lead-in wires. Heat and/or light radiation from the flashing first lamp 24 causes the adjacent radiation switch 66 to become a closed circuit between terminals 46 and 53 (or a low value of resistance), thereby connecting the circuit board terminal 32 electrically to the lead-in wire of the second lamp 25 at point 52. By the time this occurs, the firing pulse has diminished to a value insufficient to cause the second lamp 25 to flash. When the next firing pulse occurs, it is applied to the lead-in wires of the second lamp 25, via the now closed radiation switch 66, whereupon the second lamp 25 flashes, thereby causing radiation switch 67 to assume zero or low resistance, and the second lamp 25 now has an open circuit or high resistance between its lead-in wires. When the next firing pulse occurs, it is applied via now closed radiation switch 67 to the third lamp 23 via its lead-in wires which are connected to the printed circuit at points 43 and 57, thereby firing the lamp which becomes an open circuit, and the radiation from it causes the radiation switch 68 to become essentially a closed circuit across its terminals. Thus, the next firing pulse will be applied, via now closed radiation switch 68, to the lead-in wires of the fourth flash lamp 22 which are connected to the circuit at points 44 and 62, thereupon causing the lamp to flash. Since this lamp is the last lamp in the active circuit, it does not matter whether its lead-in wires are open or closed circuits after flashing. Additional flash lamps, radiation switches, and electrical conductors can be employed, if desired, using the just described principles. When the flash unit is turned around and the other connector 18' attached to the camera socket 16, the group of lamps that then become uppermost and relatively farthest away from the lens axis will be in an active circuit and will be flashed in the same manner as has been described.

Another type of sequencing circuit that could be used employs switches that are initially closed and become open circuits in response to flashing of an adjacent lamp, the lamps being a type that is a short circuit or low resistance between the lead-in wires after flashing. Other types of switching, such as those employing mechanical, current, or voltage actuated switches, can be used instead of radiation switches. It has been found that the invention achieves its objectives of providing a multiple flash unit which can contain sequencing circuitry and which reduces or eliminates the undesirable red-eye effect, and which is readily manufacturable at reasonable cost.

While a preferred embodiment of the invention has been shown and described, various other embodiments and modifications thereof will become apparent to persons skilled in the art, and will fall within the scope of the invention as defined in the following claims; for example, mechanically or percussively actuated flash lamps can be employed in the multiple flash unit instead of electrically actuated lamps as has been specifically described, and the invention can have various geometries and be embodied in the form of stacked double-decked flashcubes, and to other planar array configurations which may have more than the two operable orientations that have been specifically described. An array may have a group of lamps and reflectors in one part of the array arranged to illuminate in one direction and another group of lamps and reflectors in another part of the array arranged to illuminate in the opposite direction, the array being arranged so that in either orientation of connection to the camera only the frontwardly facing lamps can be flashed and the rearwardly facing lamps cannot be flashed. Also, an array may have two or more groups of lamps and reflectors positioned back to back, so as to illuminate in opposite directions. The term camera as used herein is intended to include a flash adapter device for a camera.

What I claim as new and desire to secure by Letters Patent of the United States is:

1. A multiple flash lamp unit for alleviating red-eye photographic results comprising a unitary structure having definable first and second regions, at least one photoflash lamp disposed in each of said regions, first and second mounting devices forming a part of said structure and disposed in or adjacent to said first and second regions respectively, said lamp in said first region being separated from said second mounting device by said second region, said lamp in said second region being separated from said first mounting device by said first region, and coupling means for transmitting flash actuation signals from said first mounting device to the lamp in said second region and from said second mounting device to the lamp in said first region respectively.

2. A multiple flash lamp unit for alleviating red-eye photographic results comprising, in a given orientation, an upper group of photoflash lamps and a lower group of photoflash lamps, all of the lamps of the upper group being located above all of the lamps of the lower group, an upper connector means and a lower connector means, first means coupling said upper connector means to each lamp of said lower group of lamps, and second means coupling said lower connector means to each lamp of said upper group of lamps, each of said coupling means enabling flashing of the lamps in the group coupled thereto in response to flash actuation signals applied to its associated connector means.

3. A flash lamp unit as claimed in claim 2, in which each of said flash lamps comprises a glass bulb having a base of greater wall thickness than that of the top of the bulb, the lamps of said upper group being positioned so that their bases face toward said lower connector means, and the lamps of said lower group being positioned so that their bases face toward said upper connector means.

4. A flash lamp unit of elongated shape having first and second oppositely disposed ends, said unit being provided with first connector means at said first end thereof and second connector means at said second end thereof, a first group of flash lamps positioned in a first section of said unit relatively nearer to said first end thereof, a second group of flash lamps positioned in a second section of said unit relatively nearer to said second end thereof, first coupling means coupling said first connector means to said second group of lamps and enabling flashing of the latter in response to flash actuation signals applied to said first connector means, and second coupling means coupling said second connector means to said first group of lamps and enabling flashing of the latter in response to flash actuation signals applied to said second connector means, said first section of the unit functioning as a flash extender for said second group of lamps and said second section of the unit functioning as a flash extender for said first group of lamps.

5. A flash lamp unit as claimed in claim 4, in which each of said flash lamps comprises a glass bulb having a base of greater wall thickness than that of the top of the bulb, said first group of lamps being positioned in the unit so that their bases face generally toward said second connector means and said second group of lamps being positioned in the unit so that their bases face generally toward said first connector means.

6. A flash lamp unit as claimed in claim 4, in which said unit is a planar array, all of said lamps being arranged in the array to illuminate in the same direction when flashed.

7. A flash lamp unit as claimed in claim 4, in which said flash lamps are electrically fired types, said first connector means being provided with electrical terminals, said first coupling means comprising circuit means connecting said electrical terminals to said second group of lamps, said second connector means being provided with electrical terminals, and said second coupling means comprising circuit means connecting said last-named electrical terminals to said first group of lamps.

8. A flash lamp unit of generally rectangular body configuration having first and second oppositely disposed end surfaces, said unit being provided with first and second connector means respectively at said first and second end surfaces, a first group of flash lamps positioned in a first section of said unit relatively nearer to said first end surface thereof, a second group of flash lamps positioned in a second section of said unit relatively nearer to said second end surface thereof, first coupling means coupling said first connector means to said second group of lamps and enabling flashing of the latter in response to flash actuation signals applied to said first connector means, and second coupling means coupling said second connector means to said first group of lamps and enabling flashing of the latter in response to flash actuation signals applied to said second connector means.

9. A flash lamp unit as claimed in claim 8, each of said first and second connector means of the unit being provided with flash actuation coupling means said first coupling means comprising means for coupling said flash actuation coupling means at the first connector means only with said second group of lamps, and said second coupling means comprising means for coupling said flash actuation coupling means at the second connector means only with said first group of lamps.

10. A flash lamp unit as claimed in claim 9, in which said unit is a planar array, all of said lamps being arranged in the array to illuminate in the same direction when flashed.

11. A flash lamp unit as claimed in claim 9, in which said lamps are electrically fired types, each of said flash actuation coupling means comprising electrical terminals, and each of said means for coupling a flash actuation coupling means with a group of lamps comprising electrical conductors.

12. A flash lamp unit as claimed in claim 11, in which said unit is an elongated planar array, all of said lamps being arranged in the array to illuminate in the same direction when flashed.

13. An elongated planar flash array as claimed in claim 12, including an elongated circuit board, said first and second connector means comprising first and second integral tabs respectively at the ends of said circuit board, means attaching said first group of lamps to said circuit board on a first half thereof that is nearest said first connector tab, means attaching said second group of lamps to said circuit board on a second half thereof that is nearest said second connector tab, said electrical conductors comprising a first group of circuit runs on said circuit board beginning on said first connector tab and extending to said second group of lamps, and a second group of circuit runs on said circuit board beginning on said second connector tab and extending to said first group of lamps.

14. An elongated planar flash array as claimed in claim 13, in which each of said flash lamps comprises a glass bulb having a base of greater wall thickness than that of the top of the bulb, said first group of lamps being positioned so that their bases face generally toward said second tab and said second group of lamps being positioned so that their bases face generally toward said first tab.

15. An elongated planar flash array as claimed in claim 13, in which each of said flash lamps comprises a pair of lead-in wires which serve as said attaching means, said means for coupling a flash actuation coupling means with the first group of lamps comprising a first switching circuit carried on said first half of said circuit board for causing sequential flashing of said first group of lamps, said means for coupling a flash actuation coupling means with the second group of lamps comprising a second switching circuit carried on said second half of said circuit board for causing sequential flashing of said second group of lamps, said first group of circuit runs comprising a first circuit run from said first connector tab to one lead-in wire of each lamp of said second group of lamps, and a second circuit run from said first connector tab to said second switching circuit, said second group of circuit runs comprising a first circuit run from said second connector tab to one lead-in wire of each lamp of said first group of lamps, and a second circuit run from said second connector tab to said first switching circuit, said first switching circuit including connections to the remaining lead-in wires of said first group of lamps and said second switching circuit including connections to the remaining lead-in wires of said second group of lamps.

16. An elongated planar flash array as claimed in claim 15, in which said first switching circuit comprises a first radiation switch carried on said circuit board near a first lamp of said first group of lamps so as to be actuated by radiation from said first lamp when flashed, said second circuit run from said second connector tab extending to and being in contact with said first radiation switch and the remaining lead-in wire of said first lamp of said first group of lamps, a conductor run on said board spaced from said second circuit run from the second connector tab and in contact with said first radiation switch and extending to and being in contact with the remaining lead-in wire of a second lamp of said first group of lamps, and in which said second switching circuit similarly comprises a first radiation switch carried on said circuit board near a first lamp of said second group of lamps so as to be actuated by radiation from said last-mentioned lamp when flashed, said second circuit run from said first connector tab extending to and being in contact with said last-named radiation switch and the remaining lead-in wire of said last-mentioned lamp, and a conductor run on said board spaced from said last-mentioned circuit run and in contact with the last-mentioned radiation switch and extending to and being in contact with the remaining lead-in wire of a second lamp of said second group of lamps.

17. An elongated planar flash array as claimed in claim 16, in which the circuit runs of said first switching circuit and said first and second circuit runs from said second connector tab are laid out in a reverse mirror image of the circuit runs of said second switching circuit and said first and second circuit runs from said first connector tab.

18. An elongated planar flash array as claimed in claim 16, including reflector means positioned between said lamps and said circuit board, said reflector means being provided with windows therethrough respectively at each of said radiation switches.

19. A circuit board for a planar flash array, comprising an elongated circuit board member having first and second integral connector tabs respectively at the ends thereof, a first group of pairs of flash lamp connection areas carried on said circuit board on a first half thereof that is nearest said first connector tab, a second group of pairs of flash lamp connection areas carried on said circuit board on a second half thereof that is nearest said second connector tab, a first group of circuit runs on said circuit board beginning on said first connector tab and extending to said second half of the circuit board, circuitry carried on said second half of the circuit board for connecting said first group of circuit runs to said second group of pairs of lamp connection areas, and a second group of circuit runs on said circuit board beginning on said second connector tab and extending to said first half of the circuit board, and circuitry carried on said first half of the circuit board for connecting said second group of circuit runs to said first group of pairs of lamp connection areas.

20. A circuit board as claimed in claim 19, in which a circuit run of said first group of circuit runs is connected to one flash lamp connection area of each pair thereof in said second group thereof, a circuit run of said second group of circuit runs being similarly connected to one flash lamp connection area of each pair thereof in said first group thereof.

21. A circuit board as claimed in claim 20, in which said circuitry carried on said first half of the circuit board and said second group of circuit runs from said second connector tab are laid out in a reverse mirror image of said circuitry carried on said second half of the circuit board and said first group of circuit runs from said first connector tab.

* * * * *